United States Patent [19]

Cutler et al.

[11] 3,957,701

[45] May 18, 1976

[54] AMINOPLAST MOULDING MATERIALS WITH CURED AMINOPLAST FILLER

[75] Inventors: Nigel A. Cutler, Barnt Green; Michael L. Bradley, Netherton, both of England

[73] Assignee: British Industrial Plastics Limited, Manchester, England

[22] Filed: Aug. 27, 1974

[21] Appl. No.: 501,191

Related U.S. Application Data

[63] Continuation of Ser. No. 337,538, March 2, 1973, abandoned.

[30] Foreign Application Priority Data

Mar. 4, 1972 United Kingdom.............. 10196/72

[52] U.S. Cl. .........................260/2.5 F; 260/17.3; 260/21
[51] Int. Cl.² .......................................... C08J 9/00
[58] Field of Search ................ 260/2.5 F, 9 R, 17.3

[56] References Cited
UNITED STATES PATENTS

| | | | |
|---|---|---|---|
| 3,038,867 | 6/1962 | Czepiel............................ | 260/2.5 F |
| 3,047,538 | 7/1962 | Steinmann........................ | 260/2.5 F |
| 3,637,548 | 1/1972 | Standish .......................... | 260/2.5 F |

FOREIGN PATENTS OR APPLICATIONS

| | | | |
|---|---|---|---|
| 2,086,303 | 1972 | France ............................... | 260/9 R |
| 1,311,421 | 3/1973 | United Kingdom................. | 260/9 R |

*Primary Examiner*—Richard B. Turer
*Attorney, Agent, or Firm*—Cushman, Darby & Cushman

[57] ABSTRACT

Aminoplastic moulding compositions include a filler which comprises or consists of a cured, particulate aminoplast material having a water absorption (absorbency) of at least 2.0 millilitres of water per gram; the aminoplast filler material preferably is a hydrophilic urea-formaldehyde foam, which has been disintegrated, or a particulate urea-formaldehyde material precipitated from a solution containing a wetting agent.

3 Claims, No Drawings

AMINOPLAST MOULDING MATERIALS WITH CURED AMINOPLAST FILLER

This is a continuation, of application Ser. No. 337,538, now abandoned filed Mar 2, 1973.

This invention concerns improvements in or relating to filled amino moulding compositions.

For many years, amino moulding compositions have been produced from aminoplastic resins filled with absorbent materials such as cellulose and wood-flour. Such fillers are relatively expensive. In recent years, aminoplastic moulding compositions have been used for moulding articles by injection moulding, in addition to the hitherto normal compresson moulding, but the compositions, in general, do not have sufficiently good flow properties to be used satisfactorily in modern high-speed injection moulding machines.

Accordingly, an object of the present invention is to obviate or mitigate the disadvantages of the relatively high costs of the fillers for and the relatively poor flow properties of aminoplastic (amino) moulding compositions.

We have now found surprisingly improved aminoplastic moulding compositions can be produced by using as the filler, or as a portion of the filler, certain aminoplast materials in cured particulate form.

According to the present invention there is provided an aminoplastic moulding composition in which the filler comprises, at least in part, a particulate cured aminoplast material having an absorbency of at least 2.0 milliliters of water per gram.

The "absorbency", as referred to herein and in the claims, is that determined by masticating one gram of the particulate cured aminoplast material on a non absorbent substrate such as a glass plate whilst adding water to the material, the absorbency being defined as the maximum volume of water absorbed by the material without separation of the water being visually noticeable. This test is effected at ambient temperature.

For the purposes of this specification, the aminoplast material with an absorbency of at least 2.0 mls. of water per gram are considered to be hydrophilic.

A particularly preferred aminoplast material is one in the form of a disintegrated urea-formaldehyde foam. This may be prepared from a urea-formaldehyde resin solution and a hardener solution by adding a wetting agent (as hereinafter defined), before or after forming the foam but prior to curing the resin component of the foam. The wetting agent is generally a surface active agent whose primary effect is to cause the foam, when cured, to lose most, if not all, of its otherwise inherent hydrophobic character, and is to be contrasted with such surface active agents as are commonly used as foaming (and/or foam stabilising) agents. It is preferred to add the wetting agent to the urea-formaldehyde resin solution prior to the foaming step and to use at least twice as much wetting agent as such foaming agent as is present in the urea-formaldehyde resin solution. It is also possible to incorporate at least some of the wetting agent into the hardener solution. The much preferred wetting agent is a water-soluble ethylene oxide condensate of a mixture of synthetic fatty alcohols, known as "EMPILAN KA 590".

It is also possible to obtain particulate disintegrated foams by using a surface active agent which acts both as foaming agent and as wetting agent (see Example H hereafter).

As will be seen from the Examples given hereafter, it is possible to use other particulate cured aminoplast materials. The preferred aminoplast materials, however have the important properties of breaking up during drying or during mixing thereof with the aminoplastic resin of the moulding compositions, to provide particulate material of high surface area, and of being more water-absorbent than the usual paper (alpha-cellulose) fillers. The aminoplast material may be modified by use of water-miscible additive such as ethylene-glycol. It will be noted that the aminoplast material of the filler is itself unfilled.

In view of the absorbent nature of the fillers used in accordance with this invention, mixing of the compositions is preferably effected by a wet technique wherein the filler is dispersed in an aqueous aminoplastic resin syrup. Dry-compounding may be used as an alternative, however. The filler (overall) preferably has a minimum absorbancy of at least 1 milliliter of water per gram; in the preferred practice of this invention, however, the filler will have absorbency of between 2.0 and about 7.0 milliliters of water per gram.

The absorbency of the aminoplast material will depend inter alia on the physical state of the aminoplast material, and on the amount of wetting agent used in its preparation. The amount of aminoplast material used as the filler or as a filler component, will be variable according to its absorbency.

Preferred mixed fillers comprise from 30 to 70 per cent by weight of the aminoplast material, and from 70 to 30% of a cellulose-based filler; a more preferred filler is 50:50 urea-formaldehyde material: alpha - cellulose. Preferably the aminoplastic resin to filler ratio is within the range from 6:1 to 1:1; as stated above, the ratio will be determined by the absorbency of the filler.

The following Examples are given to illustrate preferred embodiments of the present invention in more detail.

Example A illustrates the manufacture of an aminoplast material usable as a filler or as a filler component in the present invention; variations of this procedure are illustrated by the data in Table I, whereby a series of fillers were made.

EXAMPLE A

A urea-formaldehyde resin solution was prepared by mixing 100 parts by weight of a proprietary resin known as "Bu 700" with 23.7 parts by weight of water. To this were added 0.62 parts by weight of sodium alkyl benzene sulphonate ("NANSA HS 85 S") and 1.24 parts by weight of the wetting agent referred to earlier, EMPILAN KA 590.

A hardener solution was then prepared by mixing 60 volumes of a proprietary hardener solution known as "L 3558" with 400 volumes of 65% phosphoric acid and 3,590 volumes of water.

A urea-formaldehyde foam was prepared from these two solutions. The method and apparatus disclosed in our U.K. patent specification number 1313103 may be used for this purpose.

The resulting cured UF foam was very readily wetted by water, a 50 milliliter sample taking up approximately 49 grams of water on immersion (6.5 mls/g).

The cured foam was mechnically crushed to yield a particulate (aminoplast) urea-formaldehyde material usable as a filler for an aminoplastic moulding composition.

EXAMPLES B, C, and D

Three filler materials were made by a procedure similar to that of Example A, using the materials and quantities thereof listed against B,C,D, in Table I. B was produced in foam form but the foam collapsed in the aqueous medium to form particulate urea-formaldehyde (cured) resin. C was prepared by milling B; and D was a neutralised form of B, prepared by mixing B in a Baker Perkins mixer for longer than 30 minutes with Ca(OH)$_2$. ZnO and water followed by drying of the resultant material at about 110°C to a free water content of less than 10%.

EXAMPLES E AND F

Two filler materials were prepared by the general procedure of Example A, forming products of the same form as that of Example B,F having a urea : formaldehyde ratio of 1:1.33, instead of 1:1.6 as used for the other filler materials.

EXAMPLE G

A filler material was prepared by the general procedure of Example A, using NANSA SSA as the sole acidic component of the hardener solution (NANSA SSA is the free acid version of NANSA HS85S and comprises a 96% solution of dodecyl benzene sulphonic acid in water.) The product was of the same form as that of EXAMPLE B.

EXAMPLES H AND J

Two filler materials were prepared by the general procedure of Example A, omitting the EMPILAN KA 590; J was prepared from H in the same manner as D was prepared from B. The products were of the same form as B and D, respectively.

EXAMPLE I (COMPARATIVE)

A standard urea formaldehyde moulding material was obtained by mixing 3,664g. of urea formaldehyde resin solution with 896g. of alpha-cellulose in a 2-blade mixer. Additions of 12g. of an accelerator, 43.5g. of hexamethylenetetramine, 14g. of zinc stearate, 29g. of monoacresylglyceryl ether and 59g. of barium sulphate were made. The resulting mixture was heated to 60°C for 30 minutes, and was then oven dried at 80°C to a free-water content of from 1 to 2%, and the dried material was ball-milled. A further addition of 0.2% of zinc stearate was made. The resultant fine powder was compounded to give a moulding material.

EXAMPLE II

The procedure of Example I was repeated, except that the 896g. of alpha-cellulose filler was replaced by a mixture of 448g. of alpha-cellulose and 448g. of particulate, cured area formaldehyde foam made by the method of Example B. Also, an addition of 0.1% by weight of calcium hydroxide was made to neutralise residual acid in the urea formaldehyde foam filler. The urea formaldehyde foam became more finely divided under the mixing action.

EXAMPLE III

The procedure of Example I was repeated, except that the 896g. of alpha-cellulose was entirely replaced by 896g. of the filler of Example B, and an addition of 0.2% by weight of calcium hydroxide was made to neutralise residual acid in the filler.

EXAMPLE IV

The procedure of Example III was repeated, using the filler of Example C, neutralised as described for Example D, with a filler: resin ratio of 60:40.

Table I

| Example | Resin BU700 | Resin, Solution, parts by weight (e.g. grams) | | | | | | Parts by weight except* which are parts by volume (e.g. gram,ml) Hardener Solution | | | | |
| | | Nansa HS85S | Empilan KA590 | Teepol 514 | Water | Ethylene Glycol | Urea | Nansa HS85S | 65% H$_3$PO$_4$* | 90% HCOOH* | Nansa SSA | Water |
|---|---|---|---|---|---|---|---|---|---|---|---|---|
| A | 100 | 0.62 | 1.24 | — | 23.7 | — | — | 0.08 | 2.4 | — | — | 21 |
| B,C,D. | 120 | — | 0.5 | 1.0 | 100 | — | — | — | 1.0 | — | — | 49 |
| E | 120 | 0.6 | 1.0 | — | 100 | — | — | 0.05 | — | 5 | — | 45 |
| F | 120 | 0.6 | 1.0 | — | 100 | — | 12.8 | 0.05 | — | 5 | — | 45 |
| G | 100 | — | 0.42 | — | 43 | — | — | — | — | — | 10 | 90 |
| H,J | 100 | 1.4 | — | — | 40 | — | — | 0.26 | 1.4 | — | — | 70 |
| K | 100 | 1.8 | — | — | 27 | 20 | — | 0.08 | 2.4 | — | — | 21 |
| L | 100 | — | 0.42 | 0.84 | 830 | — | — | — | 11 | — | — | 167 |
| M | 100 | — | 0.42 | — | 830 | — | — | — | 11 | — | — | 167 |
| N | 100 | — | 0.42 | — | 830 | — | — | — | 11 | — | — | 167 |
| O | 100 | — | — | 0.84 | 830 | — | — | — | 11 | — | — | 167 |

EXAMPLE K

A filler material was prepared, similar to A except modified by the inclusion of ethylene glycol.

EXAMPLES L,M,N, and O

Four filler materials were prepared by mixing the resin solution in a vessel, and adding the hardener, where upon particulate urea-formaldehyde precipitated. N was a version of M, neutralised by the procedure described for Example D.

The following Examples illustrate the use of the above fillers in aminoplastic moulding compositions.

In Examples B to G, the resin solution was foamed and the hardener solution was injected thereinto with mixing; in Examples A,H,J and K, the hardener solution was also foamed prior to mixing with the foamed resin.

Table II summarises the properties of the filler materials prepared as above.

Table II

| Example | Physical form of Cured Resin | PH of Filler | Absorbency ml H$_2$O/G | Maximum (approx) Resin Filler Ratio |
|---|---|---|---|---|
| A | Rigid Foam | Acidic | 6.5 | — |
| B | Particulate | " | 5.0 | 75:25 |

Table II-continued

| Example | Physical form of Cured Resin | PH of Filler | Absorbency ml H₂O/G | Maximum (approx) Resin Filler Ratio |
| --- | --- | --- | --- | --- |
| C | " | " | 2.0 | 50:50 |
| D | " | Neutral | 2.4 | 64:36 |
| E | " | Acidic | 5.4 | 80:20 |
| F | " | " | 5.3 | 79:21 |
| G | " | " | 5.3 | 79:21 |
| H | " | " | 4.0 | 72:28 |
| J | " | Neutral | 2.3 | 64:36 |
| K | Rigid Foam | Acidic | 7.4 | 84:16 |
| L | Particulate | " | 5.5 | 81.19 |
| M | " | " | 5.0 | 80:20 |
| N | " Neutral | | 4.5 | 80:20 |
| O | " | Acidic | 4.0 | 78.22 |
| Powdered Cellulose | | | 4.5 | 75.25 |

It appears that the absorbency of mixed fillers are, approximately, proportionally additive.

EXAMPLE V

The procedure of Example III was repeated with a filler: resin ratio of 20:80.

EXAMPLES VI to X

The procedure of Example II was repeated except that the urea-formaldehyde filler component was, respectively, the product of Examples D, E, F, G and H.

The moulding materials of Examples I to X were moulded in order to effect B.S. 1322 tests thereon. The results are shown in Table III hereafter, from which it can be seen that teh physical properties of products according to the invention were comparable with those of the product of Example I.

Table III

| Test | I | II | III | IV | V | Example VI | VII | VIII | IX | X |
| --- | --- | --- | --- | --- | --- | --- | --- | --- | --- | --- |
| MS | 0.70 | 0.72 | 0.82 | 0.85 | 0.85 | 0.85 | 0.75 | 0.82 | 0.95 | 0.85 |
| AS | 0.70 | 0.50 | 1.24 | 1.01 | 1.75 | 0.85 | 0.45 | 0.98 | 0.83 | 0.70 |
| CWA | 60 | 63 | 100 | 104 | 48 | 47 | 61 | 78 | 46 | 43 |
| BWA | 300 | 340 | 638 | 611 | 199 | 287 | 432 | 361 | 344 | 308 |
| ES(CM) | 200 | 190 | — | — | — | 193 | 212 | 120 | 142 | 210 |
| ES(P) | 220 | 214 | — | — | — | 220 | 222 | 178 | 202 | 205 |
| SR | 14.0 | 13.9 | — | — | — | 14.2 | 13.1 | 13.2 | 13.6 | 14.0 |
| VR | 13.0 | 13.8 | — | — | — | 13.8 | 14.1 | 13.1 | 13.5 | 13.4 |
| FS | 13,500 | 13,500 | | | | 14,500 | 14,300 | 14,800 | 15,600 | 14,700 |
| SG | 1.51 | 1.49 | * | * | * | * | * | * | * | * |

In Table III, the symbols have the following meanings.
MS = Mould shrinkage (%)
AS = After shrinkage (%)
CWA = Cold Water Absorption (mg)
BWA = Boiling Water Absorption (mg)
ES(CM) = Electric Strength (cold moulded) (Volts/mil)
ES(P) = Electric Strength (preheated) (Volts/mil)
SR = Surface Resistivity (log 10 ohm)
VR = Volume Resistivity (log 10 ohm cm)
FS = Flexural Strength (lbs/sq in).
SG = Specific Gravity.
* = in the range 1.49 to 1.52

In all the Examples I to X, the filler: resin ratio is a normal one for paper filler of 28:72 (by weight), unless otherwise stated; however, since the preferred fillers have a higher absorbency, this ratio may now be increased, for example as illustrated in Table II.

Other advantages of using urea formaldehyde or melamine formaldehyde foams in disintegrated form as filler (s) are:

i. A reduction in cost is achieved, at least with urea-formaldehyde fillers (paper filler is more expensive);
ii. the moulding materials have improved flow properties and therefore better injection moulding materials may now be produced;
iii. there is no loss in properties, such as strength, and the S.G. is not increased; and
iv. products have excellent gloss.

We claim:
1. A thermosetting moulding composition including an amino-formaldehyde resin and a filler composed of α-cellulose dispersed therein, at least about 30% by weight of said filler replaced by an unfilled amino-formaldehyde material having an absorbency of at least 2.0 milliliters of water per gram and selected from the group consisting of amino-formaldehyde in the form of disintegrated foams and amino-formaldehyde materials formed as precipitates from solution, the ratio of resin to filler being from 6:1 to 1:1.
2. A thermosetting moulding composition according to claim 1, in which the filler essentially consists of the unfilled particulate cured amino-formaldehyde material.
3. A thermosetting moulding composition according to claim 1, wherein the filler comprises from 30 to 70 percent by weight based on the total weight of the filler, of the particulate unfilled cured amino-formaldehyde material.

* * * * *